Figure 1:
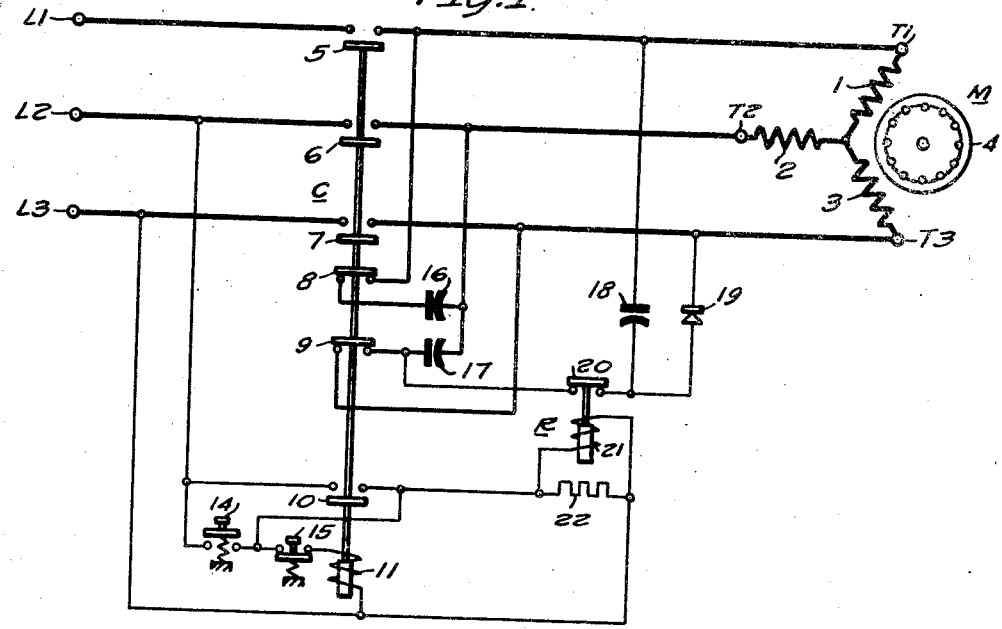

July 20, 1948. L. W. HERCHENROEDER ET AL 2,445,430
INDUCTION MOTOR BRAKING SYSTEM
Filed Feb. 21, 1947

WITNESSES:

INVENTORS
Louis W. Herchenroeder and
Arden L. Scott.
BY
ATTORNEY

Patented July 20, 1948

2,445,430

UNITED STATES PATENT OFFICE 2,445,430

INDUCTION MOTOR BRAKING SYSTEM

Louis W. Herchenroeder, Pittsburgh, Pa., and Arden L. Scott, Portland, Oreg., assignors to Westinghouse Electric Corporation, East Pittsburgh, Pa., a corporation of Pennsylvania Application February 21, 1947, Serial No. 730,058

7 Claims. (Cl. 318—212)

1

Our invention relates to control systems for alternating-current induction motors, such as squirrel-cage motors, and concerns itself mainly with a system that permits braking and stopping the motor within the period of a few revolutions.

The conventional way of obtaining a quick stop is to "plug" the motor, that is, to apply thereto a short energizing impulse in opposition to the running direction. Such plugging, however, is ineffective in the case of power failure and it may lead to an unintended run of the motor in the reverse direction.

It is an object of our invention to provide a control system which permits by simple and reliable means a quick stopping of an alternating-current motor that avoids the drawbacks of the plugging method and secures a dead stop even upon the occurrence of power failure.

The copending application, Serial No. 668,693, filed May 10, 1946, by Frederick D. Snyder and assigned to the assignee of the present application, discloses a motor control system which permits stopping an induction motor by applying a capacitive discharge to the motor windings when the motor is disconnected from the power supply. Systems according to this application have proved to be satisfactory and advantageous. For motors of relatively large horsepower rating, however, the direct-current capacitor for supplying the braking discharge current are apt to require a relatively high rating and, hence, to become expensive and space-consuming. It is, therefore, a more particular object of the present invention to improve systems of the type disclosed in the above-mentioned application so that the amount and rating of the capacitive accessories is greatly reduced without affecting the efficacy and reliability of the braking performance.

In order to achieve these objects and in accordance with a basic feature of our invention, we provide the motor control system with alternating-current capacitors which are connected across the motor immediately upon the cessation of the power supply and then establish a motor armature circuit for alternating current with the effect of braking the motor speed; and in combination therewith we apply a direct-current capacitor which is charged through a rectifier or valve means from the power supply when the motor is energized and which passes a direct-current discharge through the motor windings after the alternating-current braking has been effective. In this manner, the motor speed is first reduced to a fraction of its normal value by virtue of the alternating-current capacitors before the direct-current capacitor comes into effect to bring the motor from the reduced speed to a stop.

Figure 2:
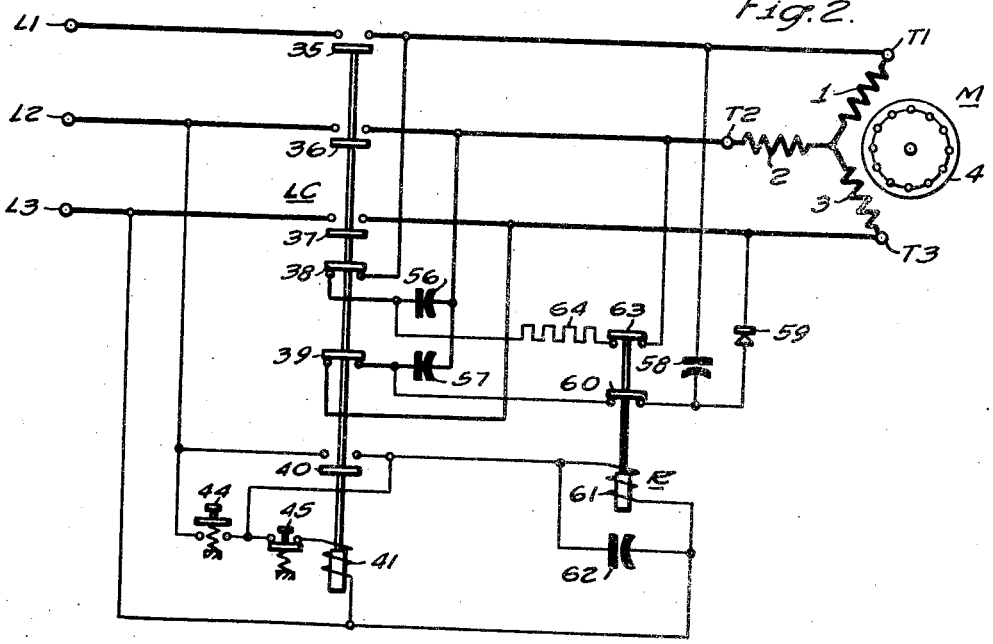

These and other features of the invention will be apparent from the embodiments exemplified by the drawing, in which Figs. 1 and 2 represent the circuit diagrams of two different control systems for squirrel-cage motors.

In Fig. 1 the field windings of the motor M are denoted by 1, 2 and 3 and the appertaining armature by 4. The motor terminals are connected to respective line terminals L1, L2 and L3 under control by the main contacts 5, 6 and 7 of a line contactor C which has three interlock contacts 8, 9 and 10 all controlled by the relay coil 11. This coil receives excitation from the line terminal L2 and L3. The coil circuit of contactor C includes a normally open start contact 14 and a normally closed stop contact 15.

Attached between motor terminals T1 and T2 is a capacitor 16 under control by the interlock contact 8. A similar capacitor 17 is attached across the motor terminals T2 and T3 under control by the interlock contact 9.

Connected across motor terminals T1 and T3 is a direct-current capacitor 18 in series with a rectifier or valve 19. The rectifier 19 is shorted by the contact 20 of a relay R when this contact and the interlock contact 9 of contactor C are closed as illustrated. The coil 21 of relay R is connected to the circuit of contactor coil 11 so as to be energized together therewith. However, the relay R is designed as a timing device and to this end, an impedance here shown as a resistor 22, is connected across the relay coil 21. Hence, when the coil circuit is deenergized, the contactor C drops out first while the dropping out of relay R is delayed.

When the start contact 14 is closed, the contactor C and relay R pick up. Contacts 5, 6 and 7 close and connect the motor M to the line terminals for operation. Immediately upon the closing of the line contactor C, the capacitor 18 is charged by rectified current, and after the motor M has performed a few revolutions, the capacitor 18 has collected a full charge. Contact 10 of contactor C closes a self-holding circuit for coils 11 and 21 so that contactor C and relay R remain picked up when, thereafter, the start contact 14 is opened. The alternating-current capacitors 16 and 17 are now disconnected from the motor due to the opening of contacts 8 and 9.

If, thereafter, the stop contact 15 is opened, the contactor C becomes immediately deenergized and disconnects the supply of power from the line terminals to the motor, while connecting the capacitors 16 and 17 across the motor windings. The motor now acts as a self-excited induction generator, and the alternating braking current passes through the capacitors 16 and 17. As a result, a braking field is effective in the motor so that the motor is forced to slow down. This type of braking becomes less effective as the motor reduces its speed so that ordinarily the motor starts coasting without being subjected to braking when the speed drops below about ⅓ of its synchronous value. At that time, however, the timing relay R drops also out and then connects the direct-current capacitor 18 across the motor terminals T1 and T3 through the closed contacts 20 and 9, while the rectifier 19 is now short-circuited by the same two contacts. The previously charged capacitor 18 then passes a direct-current discharge through the motor and thus provides a dynamic braking effect which brings the motor to a stop.

It has been found that in a system according to Fig. 1, the motor when coming to a stop may kick back a portion of a revolution. If such an effect must be avoided, the system can be modified by shorting one phase of the motor through a resistor during the discharge period of the direct-current capacitor. A modification of this type is shown in Fig. 2.

According to Fig. 2, the terminals T1, T2 and T3 of the motor M are energized from the line terminals L1, L2 and L3 through the respective main contacts 35, 36 and 37 of the line contactor LC. These main contacts, as well as three interlock contacts 38, 39 and 40, are controlled by the contactor coil 41 which receives excitation from line terminals L2 and L3. Start and stop contacts in the coil circuit of the contactor are denoted by 44 and 45, respectively. Two alternating-current capacitors 56 and 57 are connected across the motor, and a series arrangement of a direct-current capacitor 58 and a rectifier 59 are provided in the same manner as described above with reference to Fig. 1. The control relay R, in Fig. 2, has a contact 60 for shorting the rectifier 59 and its coil 61 is connected to the coil circuit of the line contactor C and provided with a parallel-connected impedance, here shown as a capacitor 62, in order to secure the desired timing effect. In contrast with the system of Fig. 1, the relay R has a second contact, denoted by 63, which when closed connects resistor 64 across the motor terminals T1 and T2 provided the interlock contact 38 of contactor C is also closed.

When in the system of Fig. 2 the stop contact 45 is actuated after the motor has been running, the contactor C drops out first and disconnects the power supply while connecting the capacitors 56 and 57 across the motor for alternating-current braking. After the lapse of the timing interval, the relay R also drops out and connects the capacitor 58 across the motor while shorting the rectifier 59 for dynamic braking. At the same time, the resistor 64 is connected across the motor field windings between terminals T1 and T2. With such a connection the motor comes to a dead stop provided a proper value for resistor 64 is chosen. For instance, when this system was applied to a 4-pole squirrel-cage motor of 1 H. P., the motor was stopped without kickback from a speed of 1800 R. P. M. with a travel of about 1.5 revolutions which was shorter than the travel obtainable with the same motor when applying the plugging method.

It will be recognized from the above-described embodiment that the desired braking effect does not depend upon the continuance of energizing voltage across the line terminals. Hence, the braking occurs in the same manner in the event of power failure. For a similar reason, there is no danger of reversing the motor and running it in the wrong direction as it may occur with plugging. Control systems according to the invention further have the advantage that the amount of equipment is remarkably small as compared with a system in which a direct-current capacitor is called upon to brake the motor speed all the way from top speed to a stop. The rectifier needed for charging the direct-current capacitor in a system according to the invention is also smaller than otherwise necessary, since it is required to charge, for instance, only about ⅓ of the capacitance otherwise needed. The reduction in the capacitance rating and, hence, in the number of capacitor elements contributes also to improving the reliability and reducing the maintenance requirements of such a system.

We prefer using capacitors of the electrolytic type although other types of capacitors may be used instead.

It will be understood by those skilled in the art that the invention consists of embodiments and modifications other than those specifically illustrated and described without departing from the objects and principles of the invention for achieving similar advantages within the scope of the essential features of the invention as set forth in the claims annexed hereto.

We claim as our invention:

1. A motor control system, comprising an alternating-current motor, a contactor connected to said motor for supplying current thereto when closed, first capacitor means controlled by said contactor so as to be connected across said motor when said contactor is deenergized to then permit the flow of regenerative braking current from said motor, second capacitor means and rectifying means connected in series with each other across said motor under control by said contactor so that said second capacitor means is charged through said rectifying means when said contactor is energized, and timing means associated with said contactor having a contact connected with said rectifying means for causing said capacitor to discharge through said motor a timed period after the opening of said contactor, so as to then continue braking said motor by capacitive discharge current.

2. A motor control system, comprising an alternating-current motor, a contactor connected to said motor for supplying current thereto when closed, first capacitor means controlled by said contactor so as to be connected across said motor when said contactor is deenergized to then permit the flow of regenerative braking current from said motor, second capacitor means and rectifying means connected in series with each other across said motor under control by said contactor so that said second capacitor means is charged through said rectifying means when said contactor is energized, and a timing relay controlled by said contactor and having a contact connected across said rectifying means for shorting the latter a time period after the opening of said contactor in order to then permit said second capacitor means to discharge through said motor to apply dynamic braking.

3. A motor control system, comprising an induction motor, a contactor connected to said motor for energizing the latter when closed, capacitor means controlled by said contactor so as to be connected across said motor when said contactor is deenergized, a rectifier and a capacitor connected across said motor under control by said contactor so that said capacitor is charged through said rectifier when said contactor is energized, a relay electrically associated with said contactor to open together therewith and having a delayed drop-out so as to close a timed interval later than said contactor, said relay having a contact connected across said rectifier for shorting the latter when dropped out to then permit said capacitor to discharge through said motor.

4. A motor control system, comprising an induction motor, a contactor connected to said motor for energizing the latter when closed and having a coil circuit provided with control contacts for controlling the contactor to open and close, capacitor means controlled by said contactor so as to be connected across said motor when said contactor is open, a rectifier and a capacitor connected across said motor under control by said contactor so that said capacitor is charged through said rectifier when said contactor is closed, a relay having a coil circuit connected with said coil circuit of said contactor to be also controlled by said control contacts, said relay having delayed performance so as to drop out a timed interval after the opening of said contactor, and a contact controlled by said relay and connected with said capacitor for causing said capacitor to discharge through said motor when said relay drops out.

5. A motor control system, comprising a three-phase motor having three terminals, a contactor connected to said terminals for energizing said motor when closed, capacitor means controlled by said contactor and connected across said terminals only when said contactor is closed, a rectifier and a capacitor series-connected with each other across two of said terminals under control by said contactor so that said capacitor is charged through said rectifier when said contactor is closed, timing means connected with said contactor and having a contact connected with said capacitor for causing said capacitor to discharge through said two terminals a timed interval after the opening of said contactor, said relay having another contact connected to said third terminal and one of said two terminals for shorting said connected terminals during the discharge period of said capacitor.

6. A motor control system, comprising a three-phase motor having three terminals, a contactor connected to said terminals for energizing said motor when closed, capacitor means controlled by said contactor and connected across said terminals only when said contactor is closed, a rectifier and a capacitor series-connected with each other across two of said terminals under control by said contactor so that said capacitor is charged through said rectifier when said contactor is closed, timing means connected with said contactor and having a contact connected with said capacitor for causing said capacitor to discharge through said two terminals a timed interval after the opening of said contactor, and a resistor connected between the third terminal and one of said two terminals under control by said relay when said relay is dropped out.

7. A motor control system, comprising a three-phase motor having three terminals, a contactor connected to said terminals for energizing said motor when closed, capacitor means controlled by said contactor and connected across said terminals only when said contactor is closed, a rectifier and a capacitor series-connected with each other across two of said terminals under control by said contactor so that said capacitor is charged through said rectifier when said contactor is closed, timing means connected with said contactor and having a contact connected with said capacitor for causing said capacitor to discharge through said two terminals a timed interval after the opening of said contactor, a resistor, and a contact in said relay connected in series with said resistor between the third terminal and one of said two terminals in order to short the two connected terminals through said resistor during the discharge period of said capacitor.

LOUIS W. HERCHENROEDER.
ARDEN L. SCOTT.